(12) United States Patent
Scoville et al.

(10) Patent No.: US 10,023,427 B2
(45) Date of Patent: Jul. 17, 2018

(54) TOUCHLESS GESTURE RECOGNITION FOR ELEVATOR SERVICE

(71) Applicant: Otis Elevator Company, Farmington, CT (US)

(72) Inventors: Bradley Armand Scoville, Farmington, CT (US); Paul A. Simcik, Southington, CT (US); Eric C. Peterson, East Longmeadow, MA (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 15/313,352

(22) PCT Filed: May 28, 2014

(86) PCT No.: PCT/US2014/039726
§ 371 (c)(1),
(2) Date: Nov. 22, 2016

(87) PCT Pub. No.: WO2015/183256
PCT Pub. Date: Dec. 3, 2015

(65) Prior Publication Data
US 2017/0144859 A1       May 25, 2017

(51) Int. Cl.
*B66B 1/34* (2006.01)
*B66B 1/46* (2006.01)
*B66B 13/14* (2006.01)
*G06F 3/01* (2006.01)
*G06K 9/00* (2006.01)
*G06K 9/62* (2006.01)

(52) U.S. Cl.
CPC ............ *B66B 1/468* (2013.01); *B66B 13/146* (2013.01); *G06F 3/017* (2013.01); *G06K 9/00355* (2013.01); *G06K 9/6202* (2013.01); *B66B 2201/4638* (2013.01); *B66B 2201/4646* (2013.01); *B66B 2201/4669* (2013.01)

(58) Field of Classification Search
CPC .................. B66B 1/468; B66B 13/146; B66B 2201/4638; B66B 2201/4646; B66B 2201/4669; G06F 3/017; G06K 9/00355; G06K 9/6202
USPC ................ 187/247, 391–393, 395, 396, 901, 187/380–388; 715/863, 864; 345/158, 345/168, 173–175
See application file for complete search history.

(56) References Cited

U.S. PATENT DOCUMENTS 5,291,020 A    3/1994   Lee
5,594,469 A *  1/1997   Freeman .............. G05B 19/106
                                                    345/157

(Continued)

OTHER PUBLICATIONS

International Search Report for application PCT/US2014/039726, dated Aug. 6, 2014, 8 pages.

(Continued)

*Primary Examiner* — Anthony Salata
(74) *Attorney, Agent, or Firm* — Cantor Colburn LLP

(57) ABSTRACT

A method for provisioning elevator service includes sensing, by a gesture interface including a sensor, a region in proximity to the gesture interface to obtain data; determining, by the gesture interface, that a first pattern in the data corresponds to a first gesture; and initiating a request for elevator service in response to determining that the first pattern corresponds to the first gesture.

17 Claims, 5 Drawing Sheets

(56) References Cited

U.S. PATENT DOCUMENTS

| | | | | |
|---|---|---|---|---|
| 5,679,934 | A * | 10/1997 | Juntunen | B66B 1/462 187/384 |
| 6,161,654 | A * | 12/2000 | Sirigu | B66B 3/00 187/391 |
| 7,877,707 | B2 * | 1/2011 | Westerman | G06F 3/04883 715/863 |
| 8,248,364 | B1 | 8/2012 | Chi et al. | |
| 8,705,872 | B2 * | 4/2014 | Ivanich | H04N 5/4403 345/156 |
| 9,045,314 | B2 * | 6/2015 | Finschi | B66B 1/467 |
| 9,079,749 | B2 * | 7/2015 | Hsieh | B66B 3/002 |
| 9,134,799 | B2 * | 9/2015 | Mark | G06F 1/1639 |
| 9,691,202 | B2 * | 6/2017 | Schuster | G07C 9/00007 |
| 9,718,641 | B2 * | 8/2017 | Finschi | B66B 1/3423 |
| 2008/0256494 | A1 | 10/2008 | Greenfield et al. | |
| 2012/0168262 | A1 | 7/2012 | Finschi | |
| 2012/0175192 | A1 * | 7/2012 | Tsou | B66B 1/468 187/247 |
| 2012/0234631 | A1 | 9/2012 | Hsieh | |
| 2013/0075201 | A1 | 3/2013 | Lee et al. | |
| 2016/0031675 | A1 * | 2/2016 | Silvennoinen | B66B 1/468 187/247 |
| 2016/0103500 | A1 * | 4/2016 | Hussey | G06F 3/046 345/173 |
| 2016/0311646 | A1 * | 10/2016 | Bryant | G06K 9/00288 |
| 2017/0166416 | A1 * | 6/2017 | Scoville | B66B 1/468 |
| 2017/0210594 | A1 * | 7/2017 | Gerstenmeyer | B66B 1/2458 |
| 2017/0313546 | A1 * | 11/2017 | King | B66B 1/2491 |

OTHER PUBLICATIONS

Jamie Condliffe, "Could This Gesture Control Be Even Better Than Leap Motion?", Mar. 12, 2013.

Joe Paradiso et al., "MIT Media Lab Responsive Environments Digito: A Fine-Grained, Gesturally Controlled Virtual Musical Instrument", downloaded May 8, 2013.

Jon Fingas, "Google Applies for Patent on Gesture-Based Car Controls", Oct. 3, 2013, downloaded from http://www.engadget.com/2013/10/03/google-applies-for-patent-on-gesture-based-car-controls/ on Jan. 9, 2014.

OpenNI, "Kone-Virtual Elevator Designer", Sep. 22, 2013, downloaded from http://www.openni.org/solutions/kone-virtual-elevator-designer/ on Jan. 9, 2014.

Thiago Teixeira, "A Survey of Human-Sensing: Methods for Detecting Presence, Count, Location, Track, and Identity", ENALAB at Yale University, ENALAB Technical Report Sep. 2010, vol. 1, No. 1, Sep. 2010.

* cited by examiner

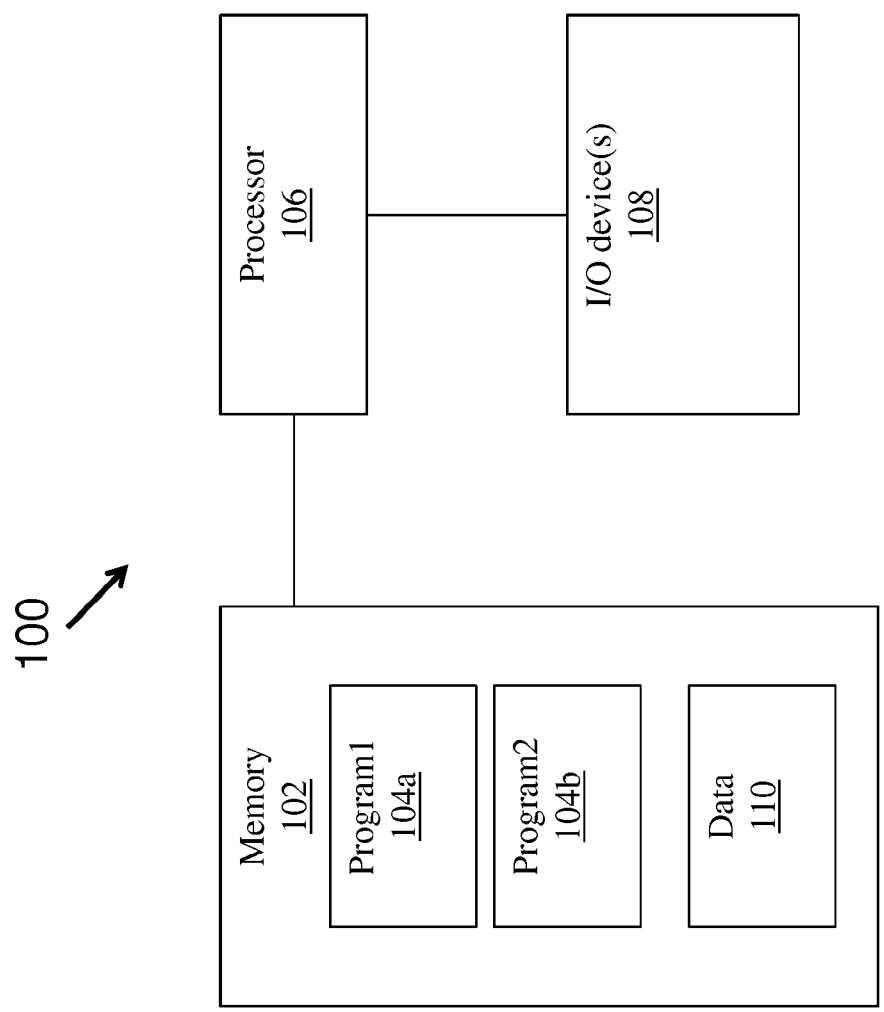

TOUCHLESS GESTURE RECOGNITION FOR ELEVATOR SERVICE

BACKGROUND

Existing conveyance devices, such as elevators, are equipped with hardware to facilitate use/control and to provide a user interface to support user interaction. For example, buttons, keypads, or touchscreens may be used to enter commands or interact with the elevator. A user must physically touch the interface to engage in an action. Moreover, the interfaces (e.g., the buttons) that are designed for a given function are not always intuitive. For example, door open/close buttons that are frequently located in an elevator car are not intuitive to people who are not familiar with elevator operations.

BRIEF SUMMARY

An embodiment is directed to a method for provisioning elevator service, the method comprising: sensing, by a gesture interface comprising a sensor, a region in proximity to the gesture interface to obtain data; determining, by the gesture interface, that a first pattern in the data corresponds to a first gesture; and initiating a request for elevator service in response to determining that the first pattern corresponds to the first gesture In addition to one or more of the features described above or below, or as an alternative, when the first gesture corresponds to an upward motion the request for elevator service corresponds to a request for an elevator car traveling in an upward direction, or wherein when the first gesture corresponds to a downward motion the request for elevator service corresponds to a request for an elevator car traveling in a downward direction.

In addition to one or more of the features described above or below, or as an alternative, the determining that the first pattern in the data corresponds to the first gesture is based on a comparison of the data to a library of gestures.

In addition to one or more of the features described above or below, or as an alternative, the library of gestures comprises a plurality of gestures associated with a particular user, and wherein the method further comprises:

In addition to one or more of the features described above or below, or as an alternative, the method includes receiving, by the gesture interface, an identifier associated with the particular user, wherein the determining that the first pattern in the data corresponds to the first gesture is based on a comparison of the first pattern in the data to the plurality of gestures associated with the particular user.

In addition to one or more of the features described above or below, or as an alternative, the identifier is based on at least one of: a mobile device identifier, a radio-frequency identification (RFID) tag, and a facial recognition technique.

In addition to one or more of the features described above or below, or as an alternative, the method includes determining, by the gesture interface, that a second pattern in the data corresponds to a second gesture.

In addition to one or more of the features described above or below, or as an alternative, the method includes initiating, by the gesture interface, at least one door of an elevator car to be controlled based on the second gesture.

In addition to one or more of the features described above or below, or as an alternative, the method includes initiating, by the gesture interface, the at least one door to be at least one of: opened, closed, and stopped in terms of motion of the at least one door.

In addition to one or more of the features described above or below, or as an alternative, the method includes initiating, by the gesture interface, the request for elevator service to be canceled based on the second gesture.

In addition to one or more of the features described above or below, or as an alternative, wherein a field of view associated with the sensor is representative to a height of a building in which the elevator system is located, and wherein a destination floor associated with the request for elevator service is selected based on a relative height of a user's hand in connection with the first gesture.

In another embodiment an apparatus comprises at least one processor; and memory having instructions stored thereon that, when executed by the at least one processor, cause the apparatus to: sense a region in proximity to the apparatus to obtain data; determine that a first pattern in the data corresponds to a first gesture; and initiate a request for elevator service in response to determining that the first pattern corresponds to the first gesture.

In addition to one or more of the features described above or below, or as an alternative, when the first gesture corresponds to an upward motion the request for elevator service corresponds to a request for an elevator car traveling in an upward direction, and wherein when the first gesture corresponds to a downward motion the request for elevator service corresponds to a request for an elevator car traveling in a downward direction.

In addition to one or more of the features described above or below, or as an alternative, the instructions, when executed, cause the apparatus to determine that a second pattern in the data corresponds to a second gesture.

In addition to one or more of the features described above or below, or as an alternative, the instructions, when executed, cause the apparatus to cause at least one door of an elevator car to be controlled based on the second gesture.

In addition to one or more of the features described above or below, or as an alternative, the instructions, when executed, cause the apparatus to: cause the at least one door to be at least one of: opened, closed, and stopped in terms of motion of the at least one door.

In addition to one or more of the features described above or below, or as an alternative, the second gesture corresponds to a side-to-side sweeping motion that serves to open the at least one door when oriented in a first direction and close the at least one door when oriented in a second direction that is substantially opposite to the first direction.

In addition to one or more of the features described above or below, or as an alternative, the at least one door comprises two doors arranged as center-opening doors, and wherein the second gesture corresponds to at least one of: a bringing together or joining of a user's hands to close the two doors, and a separation of a user's hands to open the two doors.

In another embodiment a conveyance system, includes a gesture interface configured to: obtain data corresponding a region in proximity to the conveyance system by sensing the region; analyze the data to recognize when patterns in the data correspond to one or more gestures within a threshold, the one or more gestures comprising a request for service; generate a command in response to analyzing the data; and a controller configured to manage one or more resources associated with the conveyance system in response to the command.

In addition to one or more of the features described above or below, or as an alternative, the conveyance system comprises an elevator system, and wherein the one or more gestures comprise an indication of a number corresponding to a destination dispatch request.

Additional embodiments are described below.

BRIEF DESCRIPTION OF THE DRAWINGS

The present disclosure is illustrated by way of example and not limited in the accompanying figures in which like reference numerals indicate similar elements.

FIG. 1 is a schematic block diagram illustrating an exemplary computing system;

DETAILED DESCRIPTION

Figure 2A:
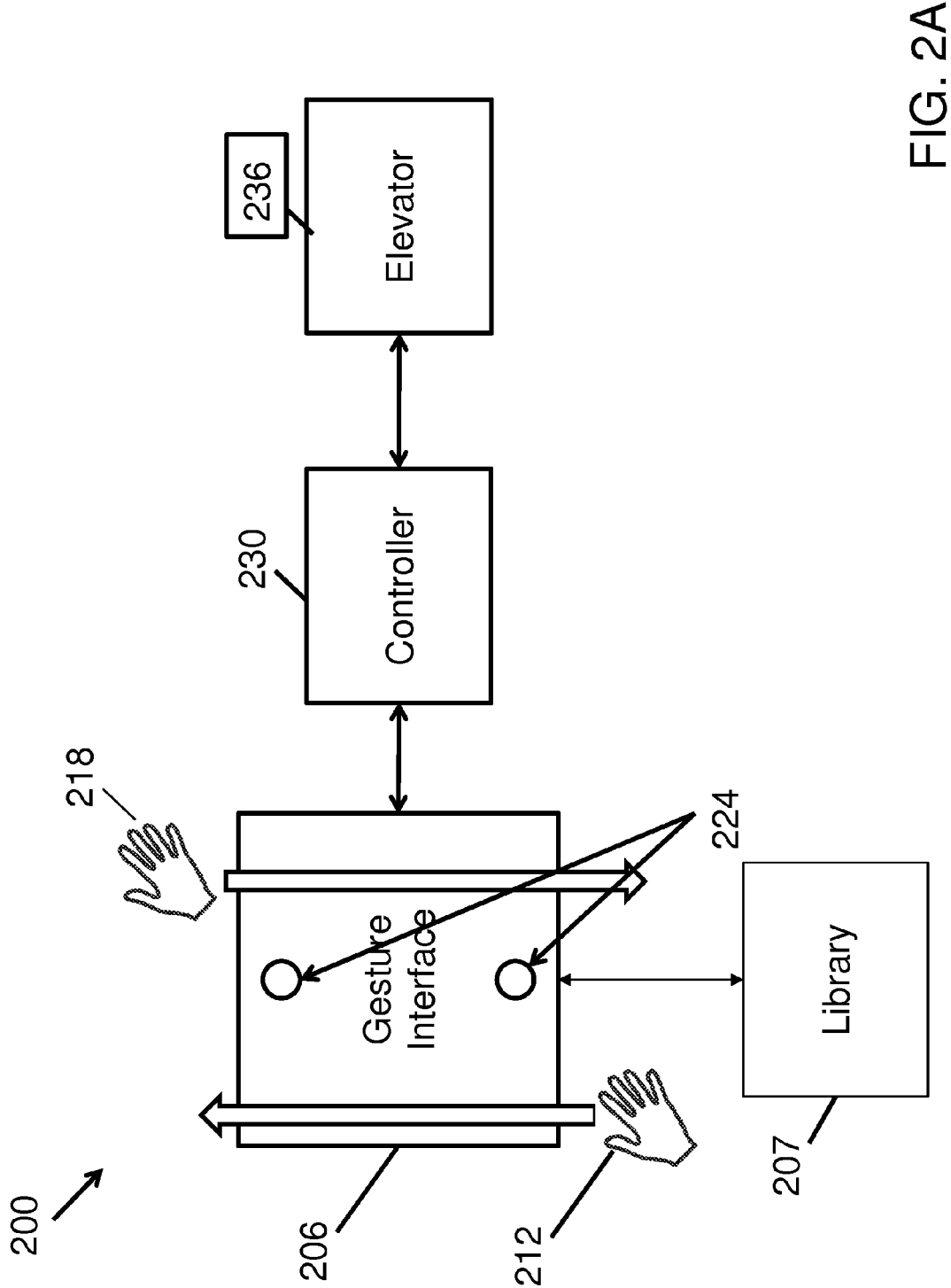
FIG. 2A illustrates an exemplary block diagram of a system for requesting elevator service in a given direction of travel based on a gesture.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this respect, a coupling between entities may refer to either a direct or an indirect connection.

Exemplary embodiments of apparatuses, systems, and methods are described for enabling a user to obtain access to elevator services and functionality using gestures. The user may obtain such access without having to physically touch a device. Aspects of the disclosure provide more or enhanced capabilities relative to conventional "touchless" implementations, such as an infrared (IR) detector.

Referring to FIG. 1, an exemplary computing system 100 is shown. The system 100 is shown as including a memory 102. The memory 102 may store executable instructions. The executable instructions may be stored or organized in any manner and at any level of abstraction, such as in connection with one or more applications, processes, routines, procedures, methods, functions, etc. As an example, at least a portion of the instructions are shown in FIG. 1 as being associated with a first program 104a and a second program 104b.

The instructions stored in the memory 102 may be executed by one or more processors, such as a processor 106. The processor 106 may be coupled to one or more input/output (I/O) devices 108. In some embodiments, the I/O device(s) 108 may include one or more of a keyboard or keypad, a touchscreen or touch panel, a display screen, a microphone, a speaker, a mouse, a button, a remote control, a joystick, a printer, a telephone or mobile device (e.g., a smartphone), a sensor, etc. The I/O device(s) 108 may be configured to provide an interface to allow a user to interact with the system 100.

The memory 102 may store data 110. The data 110 may include data provided by one or more sensors, such as a two-dimensional (2D) or three-dimensional (3D) sensor. The data 110 may be processed by the processor 106 to control one or more parameters associated with a convey-ance device. The data 110 may pertain to gesture data. For example, the data 110 may include data indicative of an environment or scene captured by one or more sensors, including gesture data that may be included in the environment/scene. The data 110 may include a library of gestures that may be compared to the captured data for purposes of recognizing gestures or discriminating between gestures.

Regarding the sensors described above, a sensor may detect user inputs, such as a presence, size, location, direction of movement, or speed of movement. Such detection may be made using capacitive, projected capacitive, optical, or acoustic systems that sense or interact with the user inputs. The inputs may include a user's body or part of the user's body, or a device or artifact carried by the user, e.g. a reflective ring or a magnet. There may not even be a "sensor device" that is attached to the system 100—rather, a smartphone or other device detects how it is being moved, or the smartphone's camera can be used to detect hand motions and interpret commands, sending that information to the system 100 through existing technique or communications (e.g., WiFi, Bluetooth, near field communications (NFC), etc.).

The system 100 is illustrative. In some embodiments, one or more of the entities may be optional. In some embodiments, additional entities not shown may be included. For example, in some embodiments the system 100 may be associated with one or more networks. In some embodiments, the entities may be arranged or organized in a manner different from what is shown in FIG. 1.

Figure 2B:
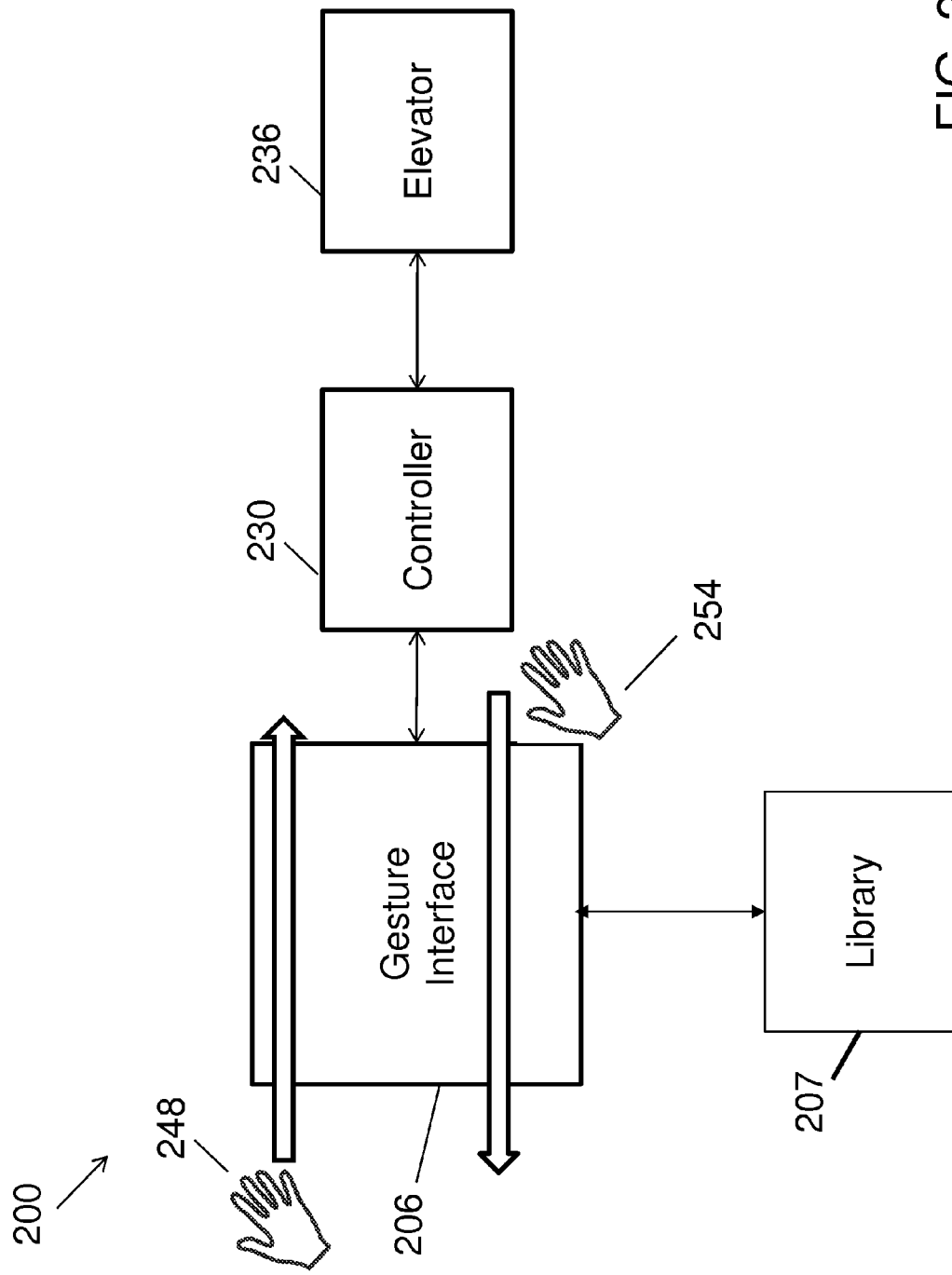
FIG. 2B illustrates an exemplary block diagram of a system for controlling an opening and closing of a single slide door of an elevator car based on a gesture.
Figure 2C:
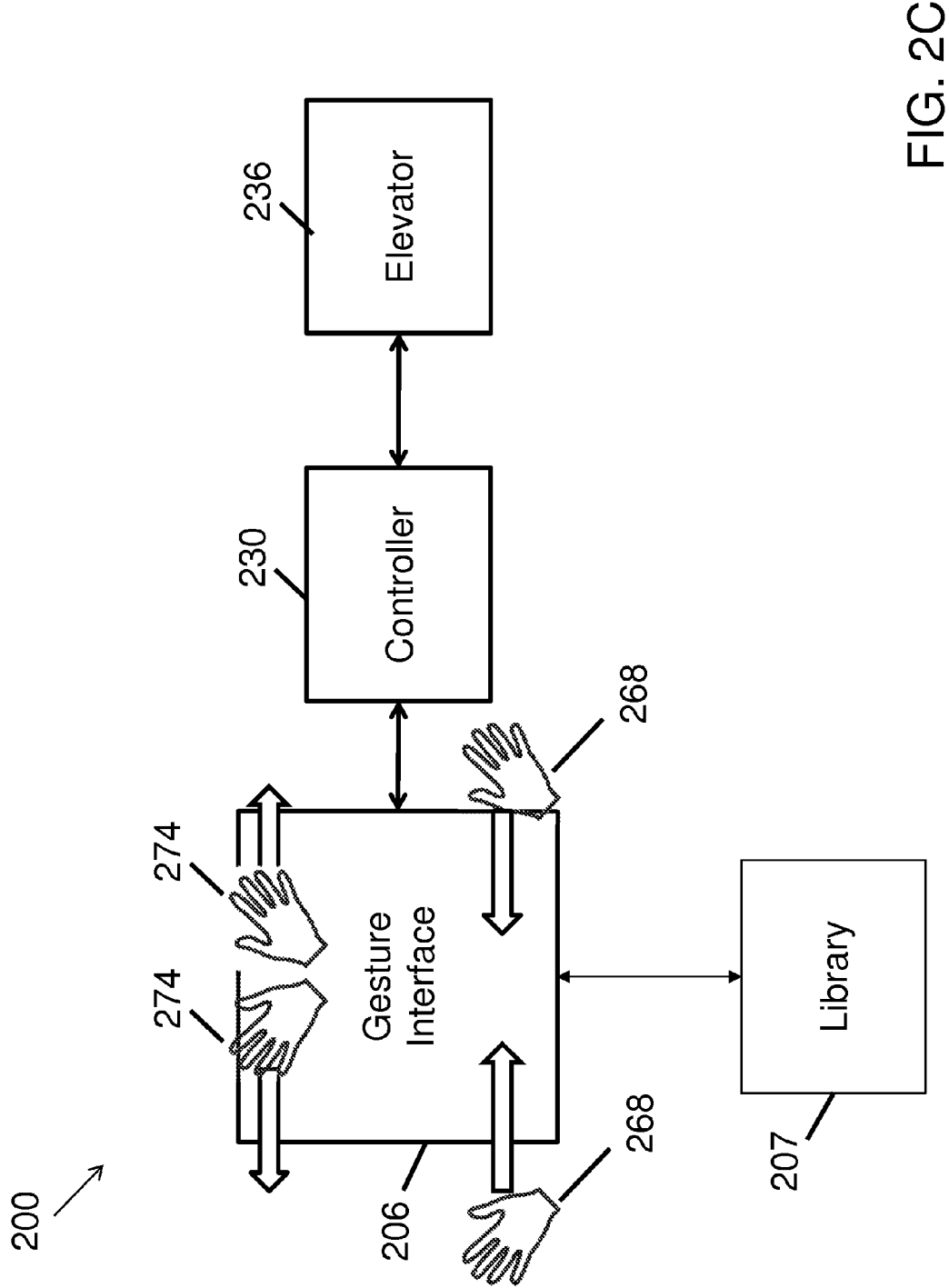
FIG. 2C illustrates an exemplary block diagram of a system for controlling an opening and closing of center-opening doors of an elevator car based on a gesture.

Turning now to FIGS. 2A-2C, an exemplary system 200 is shown. The system 200 recognizes gestures and provides elevator services or functionality based on the type or kind of gesture that is recognized.

The system 200 includes a gesture interface 206. The gesture interface 206 may be located in one or more locations. For example, the gesture interface 206 may be located in proximity to an elevator shaft or hoistway, potentially as part of a hall call box. In some embodiments, the gesture interface 206 is located in a lobby area of a building, potentially as part of a kiosk. In some embodiments, the gesture interface 206 corresponds to a macro interface with multiple inputs in addition to gesture interface 206. In some embodiments, the gesture interface 206 corresponds to several interfaces that may communicate with, e.g., an elevator controller (e.g., controller 230 described further below).

The gesture interface 206 includes one or more I/O devices (e.g., I/O devices 108 of FIG. 1), such as one or more sensors (e.g., one or more video cameras). The sensor in the gesture interface 206 may recognize gestures on its own. In other embodiments, the sensor outputs coordinates (e.g., two dimensional or three dimensional spatial coordinates) which are processed by a processor (e.g., FPGA, microprocessor, controller, etc.) in communication with the gesture interface 206 to recognize the user gesture. The processor may be located in the sensor interface 206 or located remotely.

The gesture interface 206 may be configured to monitor a surrounding area to receive one or more user gestures. As an example, in FIG. 2A a first gesture 212 is shown where a user waves her hand in an upward direction and a second gesture 218 is shown where a user waves her hand in a downward direction. In some embodiments, the first gesture 212 may correspond to a request for elevator service traveling in an upward direction within a building. In some embodiments, the second gesture 218 may correspond to a request for elevator service traveling in a downward direction within a building.

The gesture interface 206 senses the gesture and generates data (e.g. video data of the gesture). Gesture interface 206 compares the data to a library 207 or database of one or more reference gestures. Library 207 may be implemented in memory 102 of FIG. 1. If the sensed data matches a reference gesture included in the library 207 of reference gestures within a threshold, the sensed data may be processed to engage elevator functionality as described further below.

In some embodiments, the gesture interface 206 may include one or more feedback devices 224 to provide an affirmative indication to the user that the gesture has been recognized. The feedback devices 224 may include audio or visual equipment. In some embodiments, the feedback may simply indicate that a gesture has been recognized. In some embodiments, the feedback may indicate the type of action that the gesture interface 206 recognized. A user may be able, or may be required, to confirm the feedback before elevator resources are provisioned for the requested service/functionality. In this respect, the feedback devices 224 may communicate bi-directionally and may be used to provide for interactivity between the system 200 and a user of the system 200.

In some embodiments, the library 207 of reference gestures may be customized for a particular user. Such features may be useful to account for differences from a first user to a second user in terms of how the first and second users perform, or engage in, a given gesture type (e.g., gesture 212). The system 200 may be trained, potentially as part of a registration process, to build a library of reference gestures for a particular user. Thereafter, once the user attempts to access the system 200, the user may be recognized based on a user identifier. The user identifier may be affirmatively provided by the user. For example, the user may provide the identifier as a voice command to the feedback devices 224. Alternatively, if the user is carrying a mobile device, the user may be identified to the system 200 based on a mobile device identifier. In some embodiments, a radio-frequency identification (RFID) tag or facial recognition techniques may be used. Once the user is recognized by the system 200, the user's gestures may be compared to reference gestures associated with that user in the library 207 of reference gestures.

If the gesture interface 206 recognizes a gesture (e.g., gestures 212 or 218) from the data, the gesture interface 206 communicates a command to a controller 230 to initiate a request for elevator service. The controller 230 may include fixture electronics. The controller 230 provisions for an allocation of resources associated with an elevator or elevator system 236 based on the command from gesture interface 206. For example, based on the gesture 212, the controller 230 may provision an elevator car to arrive at a floor or landing where the gesture interface 206 is located to take a user in an upward direction within a building. The command from gesture interface 206 may take the form of a new-to-the-system command or a new command, or alternatively, may take the form of a synthetic version of an existing interface command (e.g., a hall call or destination call).

FIG. 2B shows an example of additional gestures that may be used in one or more embodiments. In particular, gestures 248 and 254 may be used to control a door of the elevator 236, such as single slide, two-speed door. The gesture 248, corresponding to a left-to-right sweeping motion, may be used to request that the elevator door close. The gesture 254, corresponding to a right-to-left sweeping motion, may be used to request that the elevator door open. The directions of the gestures 248 and 254 for closing and opening the door may be reversed from what is shown in FIG. 2B in a given embodiment.

FIG. 2C shows an example of additional gestures that may be used in one or more embodiments. In particular, gestures 268 and 274 may be used to control one or more doors of the elevator 236, such as center-opening doors. The gesture 268, corresponding to a bringing together or joining of one's hands, may be used to request that the elevator doors close. The gesture 274, corresponding to a separation of one's hands, may be used to request that the elevator doors open. The directions of the gestures 268 and 274 for closing and opening the doors may be reversed from what is shown in FIG. 2C in a given embodiment.

Of course, the foregoing examples associated with FIGS. 2A-2C are merely illustrative. Other gestures may be used to provide or request the functionality that was described above. Additional functions and/or gestures may be included in various embodiments, examples of which are described below.

A user may place her hand with fingers extended (i.e., a "HALT" motion) in front of the gesture interface 206 to cause elevator doors that are closing from ceasing further motion. The user may then retract her fingers and/or remove her hand to allow the elevator doors to continue to close. Similarly, a user located towards the back of an elevator car (e.g., relatively far from the elevator doors) in a crowded elevator may wave her hand rapidly back and forth in the detection zone of the sensor (in an amount greater than a threshold) in order to gain additional time to exit the elevator before the doors close or before the elevator car departs from its current floor or landing.

In some embodiments, a relative position of the gesture in the field of view of the sensor associated with the gesture interface 206 may be representative of a floor in a building. Thus, a user moving her hand up or down (e.g., gestures 212 or 218) may select a destination floor based on the relative height or position of her hand in gesturing. The user may hold her hand in place for a given period of time to confirm or lock-in the selected destination. Contrariwise, a quick gesture, e.g., an analog to a mouse "click" or clicks, may provide a confirmation of a recognized gesture. In some embodiments, one or more gestures may include an indication of a number corresponding to a destination dispatch request. In some embodiments, gestures or movements may be used to scroll through a directory of tenants within a building.

A user gesture akin to wiping a blackboard clean may be used to cancel a request for elevator service, or more generally, to cancel a selection.

Gestures may be used to control the music, on-screen content, temperature, or lighting, or other environmental controls that are available in an elevator car.

In some embodiments, group gestures may be used to quickly convey a group of people from a first floor or landing to a second floor or landing, potentially as part of express, non-stop service. In order to qualify for such service, a number of different people or users may have to provide gestures to the system 200. Intelligent crowd sensing technique may be used to qualify for such service. In some embodiments, coordinated gestures may be entered on two separate panels. The two panels may be located from one another at a distance that is greater than the reach of a single human.

Gestures can include the movement of any number or type of body part, the use of objects, etc.

Figure 3:
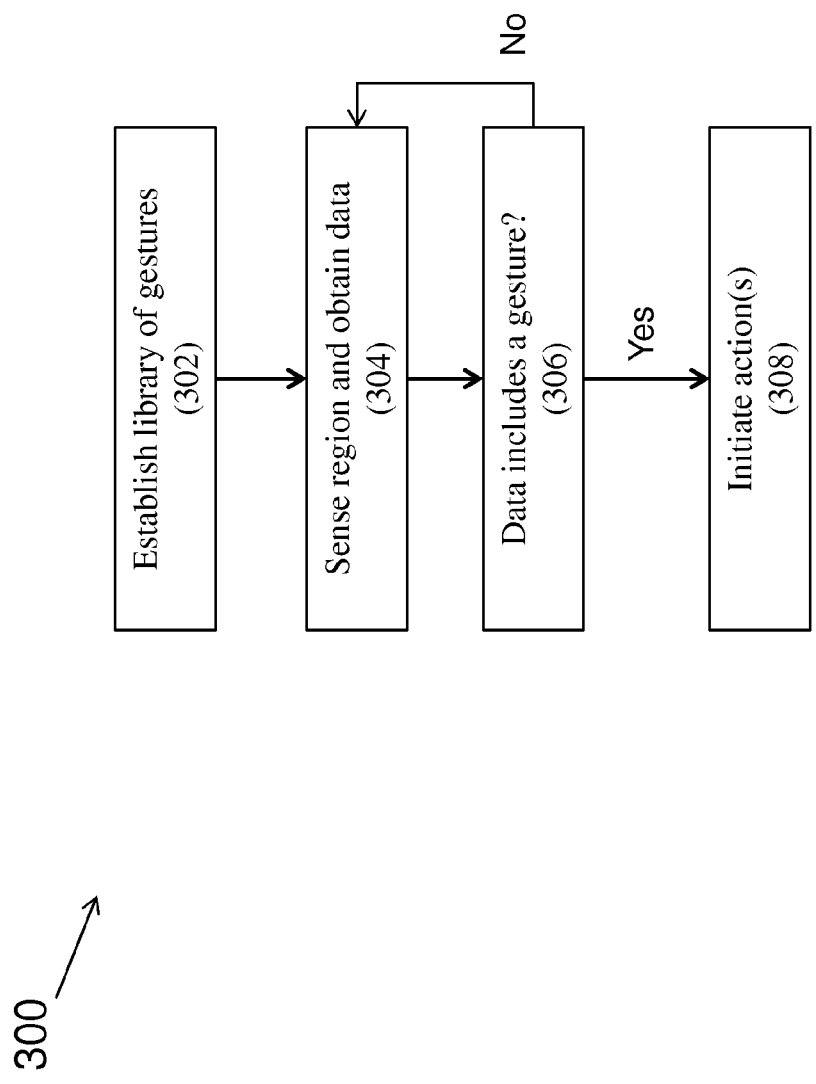
FIG. 3 illustrates a flow chart of an exemplary method for provisioning elevator service.

Turning now to FIG. 3, a method 300 for provisioning elevator service is shown. The method 300 may be executed in connection with one or more systems, components, or devices, such as those described herein. The method 300 controls the operation and functionality of an elevator based on one or more input gestures.

In block 302, library 207 or database of reference gestures is established. Library 207 of reference gestures may be provided by a manufacturer of an elevator system. The library of reference gestures may be provided by an elevator operator, a building owner, or any other person or entity. In some embodiments, the reference gestures may be updated or edited. In some embodiments, the reference gestures may be customized for a particular user or group of users.

In block 304, a region or area may be sensed. For example, in block 304 gesture interface 206 may acquire video data of an area proximate to the gesture interface. As part of the sensing, data is generated (e.g., video data), that may correspond to a gesture from a user.

In block 306, the data of block 304 is analyzed to determine if a pattern in the data matches a reference gesture included in library 207 within a threshold. If so, flow may proceed from block 306 to block 308. Otherwise, flow may proceed from block 306 to block 304, which gesture interface 206 continues to sense and obtain data.

In some embodiments, the determination of block 306 may include a confirmation that a gesture was recognized. For example, if the data of block 304 suggests a movement or gesture was attempted, but the clarity of the gesture is insufficient, a user may be provided with an indication that the gesture has not been recognized, and the user may potentially be instructed to try the gesture again. As part of block 306, a continuous feed may be provided to filter out nuisance signals (e.g., people standing near sensors "talking with their hands") to reduce false actuations.

In block 308, one or more actions are initiated based on the gesture included in the data and/or based on the context in which the elevator is operating in. As part of block 308, one or more resources associated with an elevator may be provisioned or controlled. Gesture interface 206 sends a command (e.g., a hall call, destination call, etc.) to elevator controller 230 to initiate provisioning of elevator service.

The method 300 is illustrative. In some embodiments, one or more blocks or operations (or a portion thereof) may be optional. In some embodiments, the blocks may execute in an order or sequence different from what is shown in FIG. 3. In some embodiments, additional blocks not shown may be included.

Embodiments provide user convenience, as the user has an ability to interact with an elevator system in a more intuitive manner. For example, a user may use intuitive gestures to specify elevator motion or door motion. A user is not required to touch or contact public facilities or infrastructure. A hand gesture in a sensing area initiates elevator service, which may be useful for people with disabilities. Gesturing is also useful when one has her hands occupied (e.g., holding a full beverage) and finger use is limited.

A building owner or provider of elevator infrastructure may leverage one or more aspects of embodiments to more efficiently provide elevator service and to control one or more elevators. For example, the use of mechanical interfaces may be reduced, thereby extending the operational lifetime of traditional button interfaces.

While some of the examples described herein related to elevators, aspects of this disclosure may be applied in connection with other types of conveyance devices, such as a dumbwaiter, an escalator, a moving sidewalk, a wheelchair lift, etc.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments may be implemented using one or more technologies. In some embodiments, an apparatus or system may include one or more processors, and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer program products or computer-readable media, such as a transitory and/or non-transitory computer-readable medium. The instructions, when executed, may cause an entity (e.g., an apparatus or system) to perform one or more methodological acts as described herein.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional.

What is claimed is:

1. A method for provisioning elevator service, the method comprising:
   sensing, by a gesture interface comprising a sensor, a region in proximity to the gesture interface to obtain data;
   receiving, by the gesture interface, an identifier associated with the particular user;
   determining, by the gesture interface, that a first pattern in the data corresponds to a first gesture based on a comparison of the data to a library of reference gestures, wherein the library of reference gestures comprises a plurality of reference gestures associated with the particular user; and
   initiating a request for elevator service in response to determining that the first pattern corresponds to the first gesture.

2. The method of claim 1, wherein when the first gesture corresponds to an upward motion the request for elevator service corresponds to a request for an elevator car traveling in an upward direction, or wherein when the first gesture corresponds to a downward motion the request for elevator service corresponds to a request for an elevator car traveling in a downward direction.

3. The method of claim 1, wherein the identifier is based on at least one of: a mobile device identifier, a radio-frequency identification (RFID) tag, and a facial recognition technique.

4. The method of claim 1, further comprising:
   determining, by the gesture interface, that a second pattern in the data corresponds to a second gesture.

5. The method of claim 4, further comprising:
initiating, by the gesture interface, at least one door of an elevator car to be controlled based on the second gesture.

6. The method of claim 5, further comprising:
initiating, by the gesture interface, the at least one door to be at least one of:
opened,
closed, and
stopped in terms of motion of the at least one door.

7. The method of claim 4, further comprising:
initiating, by the gesture interface, the request for elevator service to be canceled based on the second gesture.

8. A method for provisioning elevator service, the method comprising:
sensing, by a gesture interface comprising a sensor, a region in proximity to the gesture interface to obtain data;
determining, by the gesture interface, that a first pattern in the data corresponds to a first gesture; and
initiating a request for elevator service in response to determining that the first pattern corresponds to the first gesture;
wherein a field of view associated with the sensor is representative to a height of a building in which the elevator system is located, and wherein a destination floor associated with the request for elevator service is selected based on a relative height of a user's hand in connection with the first gesture.

9. An apparatus comprising:
at least one processor; and
memory having instructions stored thereon that, when executed by the at least one processor, cause the apparatus to:
sense a region in proximity to the apparatus to obtain data;
receive an identifier associated with a particular user;
determine that a first pattern in the data corresponds to a first gesture based on a comparison of the data to a library of reference gestures, wherein the library of reference gestures comprises a plurality of reference gestures associated with the particular user; and
initiate a request for elevator service in response to determining that the first pattern corresponds to the first gesture.

10. The apparatus of claim 9, wherein when the first gesture corresponds to an upward motion the request for elevator service corresponds to a request for an elevator car traveling in an upward direction, and wherein when the first gesture corresponds to a downward motion the request for elevator service corresponds to a request for an elevator car traveling in a downward direction.

11. The apparatus of claim 9, wherein the instructions, when executed, cause the apparatus to:
determine that a second pattern in the data corresponds to a second gesture.

12. The apparatus of claim 11, wherein the instructions, when executed, cause the apparatus to:
cause at least one door of an elevator car to be controlled based on the second gesture.

13. The apparatus of claim 12, wherein the instructions, when executed, cause the apparatus to:
cause the at least one door to be at least one of:
opened,
closed, and
stopped in terms of motion of the at least one door.

14. The apparatus of claim 12, wherein the second gesture corresponds to a side-to-side sweeping motion that serves to open the at least one door when oriented in a first direction and close the at least one door when oriented in a second direction that is substantially opposite to the first direction.

15. The apparatus of claim 12, wherein the at least one door comprises two doors arranged as center-opening doors, and wherein the second gesture corresponds to at least one of:
a bringing together or joining of a user's hands to close the two doors, and
a separation of a user's hands to open the two doors.

16. A conveyance system, comprising:
a gesture interface configured to:
obtain data corresponding a region in proximity to the conveyance system by sensing the region;
receive an identifier associated with a particular user;
analyze the data to recognize when patterns in the data correspond to one or more gestures within a threshold based on a comparison of the data to a library of reference gestures, wherein the library of reference gestures comprises a plurality of reference gestures associated with the particular user, the one or more gestures comprising a request for service;
generate a command in response to analyzing the data; and
a controller configured to manage one or more resources associated with the conveyance system in response to the command.

17. The conveyance system of claim 16, wherein the conveyance system comprises an elevator system, and wherein the one or more gestures comprise an indication of a number corresponding to a destination dispatch request.

* * * * *